Oct. 14, 1952     E. L. TRAYCIK     2,613,471
ARTIFICIAL BAIT

Filed Sept. 27, 1946

INVENTOR.
EUGENE L. TRAYCIK.
BY
Barnes, Kisselle, Laughlin & Raisch
ATTORNEYS.

Patented Oct. 14, 1952

2,613,471

UNITED STATES PATENT OFFICE 2,613,471

ARTIFICIAL BAIT

Eugene L. Traycik, Cloquet, Minn.

Application September 27, 1946, Serial No. 699,728

9 Claims. (Cl. 43—42.31)

This invention relates to an artificial bait and it is an object of the invention to provide a bait having life-like action in the water and which will be attractive to fish.

According to the invention, the bait may be so constructed as to provide lateral tracks on which freely rolling balls may oscillate back and forth, one in the fore part of the body and one in the rear part. By shifting their centers of gravity in opposite directions, the sinuous movement of the bait through the water is accentuated. A clicking noise is produced and by making the bait transparent and the balls of lustrous material, an irregular flashing appearance is obtained.

These and other objects are attained by the construction illustrated in the drawing wherein—

In the preferred form illustrated, the bait comprises a hollow longitudinal body 10 of any desired shape simulating more or less that of a fish. The body may be formed in two portions divided along the line 12 and secured together by cement or other suitable fastening means. A line attaching ring 14 is provided at the front end and one or more hook attachments 16 at the rear end and bottom. The body may be formed of any desired material, it being preferred to use molded plastic which is at least in part transparent.

Figure 1:
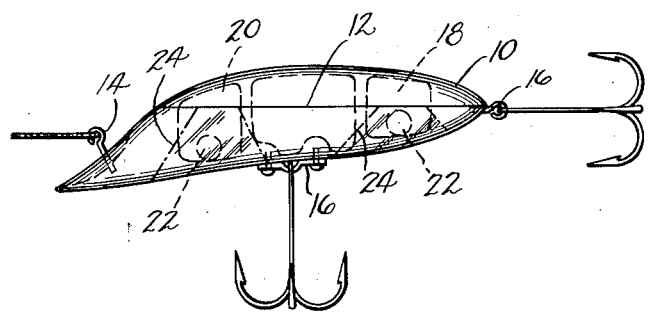
Figure 1 is a side view of a bait embodying a preferred form of the present invention.
Figure 2:
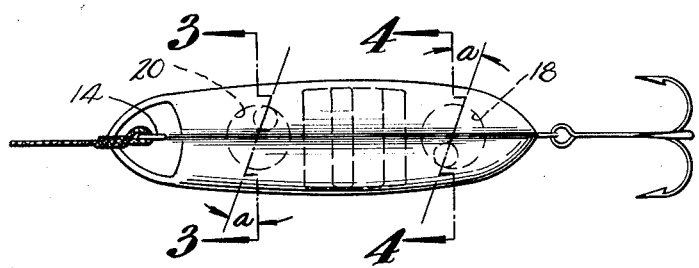
Figure 2 is a top view of the bait in Figure 1.
Figure 3:
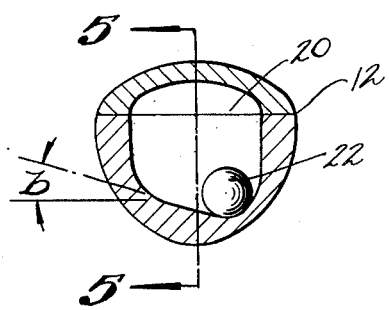
Figure 3 is an enlarged cross section on line 3—3 of Figure 2 with angles greatly accentuated.
Figure 4:
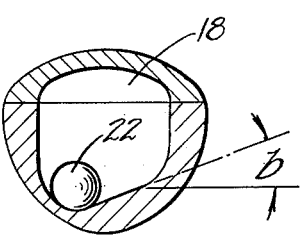
Figure 4 is an enlarged cross section on line 4—4 of Figure 2 with angles greatly accentuated.
Figure 5:
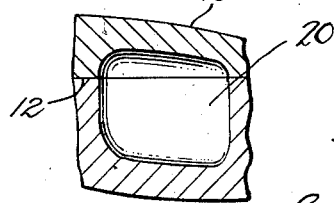
Figure 5 is an enlarged cross section on line 5—5 of Figure 3.

Within the body 10 there is provided two chambers 18 and 20 which as is shown in Figure 2 are circular in horizontal section. The bottoms of these chambers are generally flat and inclined to the horizontal in a direction both longitudinally and transversely of body 10 as illustrated in Figures 3 and 4. The angle of inclination b may be small, preferably in the neighborhood of 3° and may be anything within the range of ½° to 5°. It will be noted that the bottom of chamber 20 inclines downwardly to the right while that of chamber 18 inclines downwardly to the left. Also as noted from Figure 2, the diameter of the chambers in the direction of greatest inclination is preferably not at right angles to the longitudinal axis of the bait and departs therefrom by an angle indicated at a. This is also in the neighborhood of 3°. There is thus provided inclined transverse tracks for freely rolling balls 22 in each chamber.

The position vertically of the bottom walls of the chamber 18 and 20 is preferably such that the center of gravity of the forward ball 22 is below the natural line of pull from the ring 14 while the center of the rearward ball 22 is above that line. It is preferred to make the balls of highly polished silvery metal and to provide transparent walls at least in the zones adjacent the lower part of the ball chambers. Thus the zones indicated by the dot-dash lines 24 may be transparent or, if desired, the entire body 10 may be formed of transparent plastic.

A bait thus constructed provides an attractive fish lure in as much as it has been found that the action of the balls 22 is such that they roll from side to side in unison but in opposite phase as the bait wobbles through the water while trolling or retrieving a cast. This greatly accenuates the side to side movement of the bait and because of the transparent body portions and the shiny surface of the balls, a constantly changing series of flashes are produced which attract strikes. In addition, the clicking noise of the balls as they strike against the side walls of the chambers is conducted through the water and has the effect of attracting fish by the sound produced.

It will be noted that the slightest movement of the bait will cause the balls to change their position and thereby shift the center of gravity of the bait. The constant shifting of the center of gravity causes the bait to travel in an undetermined course in the water. All other baits with which I am familiar have a set course and behave the same at all times. This bait, due to the compound angle at the bottom of chambers 18 and 20, does not have a regular movement and never travels a set course.

It will thus be seen that the present invention provides an improved lure having a natural action simulating that of a swimming fish together with a striking appearance and sound which serve to attract large fish from a long distance.

I claim:

1. An artificial bait comprising an elongated body provided with at least two hollow chambers spaced longitudinally of the body, each of said chambers containing a freely rolling ball and having a flat portion at the bottom on which said ball is free to roll, said flat portions being oppositely inclined to the horizontal in a direction both longitudinally and transversely of the body whereby one of said balls normally tends to roll forwardly and toward one side of the bait and the other tends to roll rearwardly and toward the other side of the bait.

2. An artificial bait comprising an elongated body provided with at least two hollow chambers spaced longitudinally of the body, each of said chambers containing a freely rolling ball and having a flat, substantially circular portion at the bottom on which said ball is free to roll, said flat portions being oppositely inclined to the horizontal in a direction both longitudinally and transversely of the body whereby one of said balls normally tends to roll forwardly and toward one side of the bait and the other tends to roll rearwardly and toward the other side of the bait.

3. An artificial bait comprising an elongated body provided with at least two hollow chambers spaced longitudinally of the body, each of said chambers having a track at the bottom thereof extending in a direction generally transversely of the longitudinal axis of the body, a freely rolling ball on each of said tracks, said tracks each having a high end and a low end spaced vertically apart and being inclined downwardly from said high end to said low end, said high and low ends of each track being disposed on opposite sides of said body, one track having its high end on one side of said body and the other track having its high end on the opposite side of said body whereby said balls are spaced apart longitudinally of said body and normally gravitate to opposite sides of the body.

4. An artificial bait as set forth in claim 3 wherein said tracks are inclined at an angle of between ½° to 5° from the horizontal.

5. An artificial bait as set forth in claim 3 wherein said tracks are inclined to the horizontal in a direction both longitudinally and transversely of said body.

6. An artificial bait as set forth in claim 3 wherein said tracks are spaced apart vertically.

7. An artificial bait as set forth in claim 3 including a line attachment at the forward end of said body, said tracks being spaced apart vertically such that one of said balls is positioned above and the other ball below the natural line of pull from said attachment.

8. An artificial bait as set forth in claim 3 wherein the bottom walls of said chambers provide said tracks.

9. An artificial bait as set forth in claim 8 wherein said bottom walls are substantially flat and said chambers are generally circular in horizontal section.

EUGENE L. TRAYCIK.

REFERENCES CITED

The following references are of record in the file of this patent:

UNITED STATES PATENTS

| Number | Name | Date |
|---|---|---|
| 841,429 | Passage | Jan. 15, 1907 |
| 1,870,559 | Drake | Aug. 9, 1932 |
| 2,270,487 | Withey | Jan. 20, 1942 |